United States Patent

Peyre

[11] Patent Number: 5,808,543
[45] Date of Patent: Sep. 15, 1998

[54] ELECTRICAL ANTI-THEFT SECURITY SYSTEM, ESPECIALLY FOR A MOTOR VEHICLE

[75] Inventor: Jean Peyre, Houilles, France

[73] Assignee: Valeo Securite Habitacle, Croissy-sur-Seine, France

[21] Appl. No.: 623,315

[22] Filed: Mar. 26, 1996

[51] Int. Cl.$^6$ .................................................. B60B 25/10
[52] U.S. Cl. .................. 340/426; 340/428; 180/271; 180/287; 307/10.3; 307/10.6; 70/247
[58] Field of Search .................. 340/426, 425.5, 340/428, 438, 441, 687; 180/271, 287, 289; 307/10.2, 10.3, 10.5, 10.6; 70/247, 248

[56] References Cited

U.S. PATENT DOCUMENTS

| | | | |
|---|---|---|---|
| 3,735,833 | 5/1973 | Sutkowski | 180/289 |
| 3,827,526 | 8/1974 | Smith | 180/287 |
| 4,250,976 | 2/1981 | Mochida | 180/271 |
| 4,471,852 | 9/1984 | Schield et al. | 180/287 |
| 5,132,661 | 7/1992 | Pinnow | 340/825.31 |
| 5,451,925 | 9/1995 | Le | 340/426 |
| 5,554,966 | 9/1996 | Iijima et al. | 340/687 |
| 5,598,140 | 1/1997 | Eizen | 340/426 |
| 5,606,306 | 2/1997 | Mutoh et al. | 340/426 |
| 5,654,689 | 8/1997 | Peyre et al. | 340/426 |

FOREIGN PATENT DOCUMENTS

| | | |
|---|---|---|
| 2710599 | 7/1995 | France . |
| 836750 | 4/1952 | Germany . |

OTHER PUBLICATIONS

ATX Automobiltechnische Zeitschrift, vol. 96, No. 5, May 1994, Stuttgart, DE, pp. 321–323,330.

Primary Examiner—Jeffery Hofsass
Assistant Examiner—Davetta Woods
Attorney, Agent, or Firm—Morgan & Finnegan, L.L.P.

[57] ABSTRACT

An electrical anti-theft security system for a motor vehicle includes an immobilising device for inhibiting power supply to the starter of the vehicle so long as the motor, incorporated in the anti-theft system and arranged to drive a blocking member, such as a steering lock, has not reached the unlocked position. The immobilising device is also arranged to prevent the system from being locked unless the vehicle is at rest.

13 Claims, 9 Drawing Sheets

ELECTRICAL ANTI-THEFT SECURITY SYSTEM, ESPECIALLY FOR A MOTOR VEHICLE

FIELD OF THE INVENTION

The present invention relates to anti-theft security systems, in particular for a motor vehicle.

BACKGROUND OF THE INVENTION

It has previously been proposed to provide apparatus which enables the doors or other opening parts of something that is capable of being broken into by unauthorised persons, and in particular a motor vehicle, to be unlocked by remote control, and therefore without any contact, either electrical or mechanical, with the doors or other opening parts. In particular, keyless access techniques have been developed which enable access to be gained to a vehicle without the need to find a mechanical key, or the equivalent of a key, in order to gain access.

Such a system is very attractive from the comfort or convenience point of view and also because it offers various possibilities for obtaining access using modern information technology.

In the application of this concept to the locking and unlocking of opening parts, such as doors, for example those of a motor vehicle, or the locking and unlocking of an anti-theft security system for a vehicle, such as that which involves locking the steering column or the output shaft of the gearbox of a vehicle, mechanical systems have been proposed in these contexts which employ electrical actuating devices, for example a rotary electric motor or an electromagnet.

When the system for obtaining access recognises that a right of access exists, and that an unauthorised demand for access also exists, a control member produces a command for actuation of the system which excites the electrical actuating device. The anti-theft system and/or the lock changes state by passing from the locked condition to the unlocked condition. When the user leaves the vehicle, and/or when it is desired to activate the anti-theft system, a similar sequence takes place in reverse.

In one known design, which is described and shown in the specification of French patent application No. 93 11671 of 30 Sep. 1993, it was proposed to provide a method of control for an anti-theft system for a motor vehicle, in particular with a remote control access system, which, in particular, employs a switch for controlling starting of the vehicle, and the supply of electrical power to various electrical circuits of the vehicle.

In that method, during a phase of deactivation of the anti-theft system, contact is made with the vehicle by means of, for example, a telecontrol unit. An anti-theft security switch is then operated, which reproduces the manipulation of the conventional mechanical keys, and a predetermined position of the security switch is detected so as to set up an interrogation procedure in order to identify the demand to unlock the anti-theft system. In response to this, a command or order for actuation of successive positions of the security switch, and finally a command to unlock the anti-theft system, are produced.

In an activating phase of the anti-theft system, the step in which the anti-theft system is activated by operation of the security switch is detected. This operation of the switch reproduces the conventional manipulations of mechanical keys. Once this step is completed, the system is activated, and the successive positions of the security switch are deactivated.

In order to realise such a procedure in practice, it is necessary to provide an electrical anti-theft security system of the type comprising:

an anti-theft security switch for controlling starting of the engine of the vehicle and the power supply to various electrical circuits of the vehicle;

a motorised security device comprising a blocking member, such as a steering column lock, and an electric motor for moving the blocking member between a locked position and an unlocked position;

and a central anti-theft unit which is connected to the elements mentioned above for the purpose of implementing a procedure in which the anti-theft system is armed or disarmed.

This system is also of the type in which the anti-theft security switch comprises:

a key interruptor for detecting simulation of the introduction of a key into the anti-theft switch;

and a multiple position control interruptor for controlling, in sequence, the power supply for a plurality of electrical circuits of the vehicle and for the starter, this control interruptor comprising a movable control contact which is connected to one polarity of an electrical power supply source, and a set of fixed contacts with which the movable contact makes successive contact during operation of the security switch with a view to enabling the vehicle to be started, the said fixed contact with which the movable contact engages in the succession being connected to the starter, and the control interruptor being unable to be actuated except in the presence of a key; and an immobilising device, for inhibiting the control interruptor, which device prevents the movable control contact from making contact with the fixed contact associated with the starter so long as the anti-theft system is not in its unlocked condition, and which, in response to a release signal from the central anti-theft unit, enables the movable contact to come into contact with the fixed contact associated with the starter.

Such a system will be referred to as a system of the kind specified.

DISCUSSION OF THE INVENTION

An object of the present invention is to propose an electrical anti-theft system of the kind specified, which includes an immobilising device in the control interruptor, for example, an electromagnet and which prevents any starting of the vehicle so long as the blocking member of the said motorised security device is not in its unlocked condition, and which also prevents any possibility of the anti-theft system becoming activated into its locked condition unless the vehicle is stationary.

According to the invention, an electrical anti-theft system of the kind specified is characterised in that:

the immobilising device comprises a power supply unit which is connected directly to the electrical power supply source, and which is connected to the central anti-theft unit;

in that it includes means for detecting the unlocked condition of the system, these detecting means being such as to deliver a corresponding signal to the central anti-theft unit; and in that the central anti-theft unit is unable to transmit a release signal to the immobilising device except when the central anti-theft unit has received an unlocking signal from the detecting means.

According to a preferred feature of the invention, the drive motor of the motorised security device is connected to the power supply source through the key interruptor in the absence of a key, and, when a key is introduced, is connected thereto through a power supply line connected to a fixed contact, corresponding to the unlocked condition of the system and being part of the control interruptor, and with which the movable control contact cooperates at the beginning of its course of travel during operation of the control switch with a view to starting the engine, and, in an inhibiting position, an inhibiting member of the immobilising device is interposed between the fixed contact corresponding to the unlocked condition of the system and the fixed contact connected to the starter.

The detecting means preferably comprise at least one interruptor for detection of the unlocked state of the system and comprising a movable contact permanently connected to the central anti-theft unit and connected to the power supply source when a key is introduced, and which is arranged to cooperate with a first fixed contact, connected to the central anti-theft unit, when the system is in its unlocked condition, and with a second fixed contact connected to the central anti-theft unit and to the drive motor of the motorised security device when the latter is in its locked condition.

Preferably, the anti-theft system includes an immobiliser interruptor interposed between the central anti-theft unit and the power supply unit for the immobilising device, such as to interrupt the said line when the system is not in its unlocked condition.

The immobiliser interruptor preferably has a movable contact which is linked in tandem to the movable contact of the interruptor for detection of the unlocked condition of the system.

According to another preferred feature of the invention, the anti-theft system includes an interruptor for detecting the locked condition of the system, which comprises a movable contact connected to the electrical supply source in the absence of a key, and which is arranged to cooperate with a first fixed contact connected to the central anti-theft unit when the system is in its locked condition, and with a second fixed contact permanently connected to the central anti-theft unit, to the drive motor of the motorised security device, and to the second fixed contact of the interruptor for detecting the unlocked state of the system, when the system is in its unlocked condition.

In another embodiment of the invention, the detecting means comprise at least one sensor for detecting the position of the drive motor, or that of the blocking member of the security device, in the unlocked condition of the system, the said sensor being connected to the central anti-theft unit.

The central anti-theft unit preferably transmits a release signal to the immobilising device only when it has received an unlocking signal from the position sensor.

The detecting means may include a sensor for detecting the position of the drive motor or the blocking member of the security device, in the locked condition of the system, the said sensor being connected to the central anti-theft unit.

The anti-theft security switch may be of the rotary type.

The key interruptor preferably includes a movable contact which is connected to the power supply source, and which is arranged to cooperate with the first fixed contact connected to the drive motor of the motorised security device in the absence of a key, and a second fixed contact connected to the central anti-theft unit in the presence of a key which has been introduced, so as to transmit to the central unit a signal representing a demand for unlocking or locking of the system.

The drive motor is preferably connected electrically to the key interruptor and to the fixed contact corresponding to the unlocked condition, through a power supply unit which receives signals from the central anti-theft unit for controlling locking or unlocking of the system.

The immobilising device is preferably in the form of an electromagnet, the core of which is biased resiliently towards an inhibiting position, and which is put into a retracted position when the coil of the electromagnet is energised.

Further features and advantages of the invention will appear more clearly on a reading of the following detailed description of preferred embodiments of the invention, given by way of example only and with reference to the accompanying drawings.

DESCRIPTION OF PREFERRED EMBODIMENTS OF THE INVENTION

Figure 1:
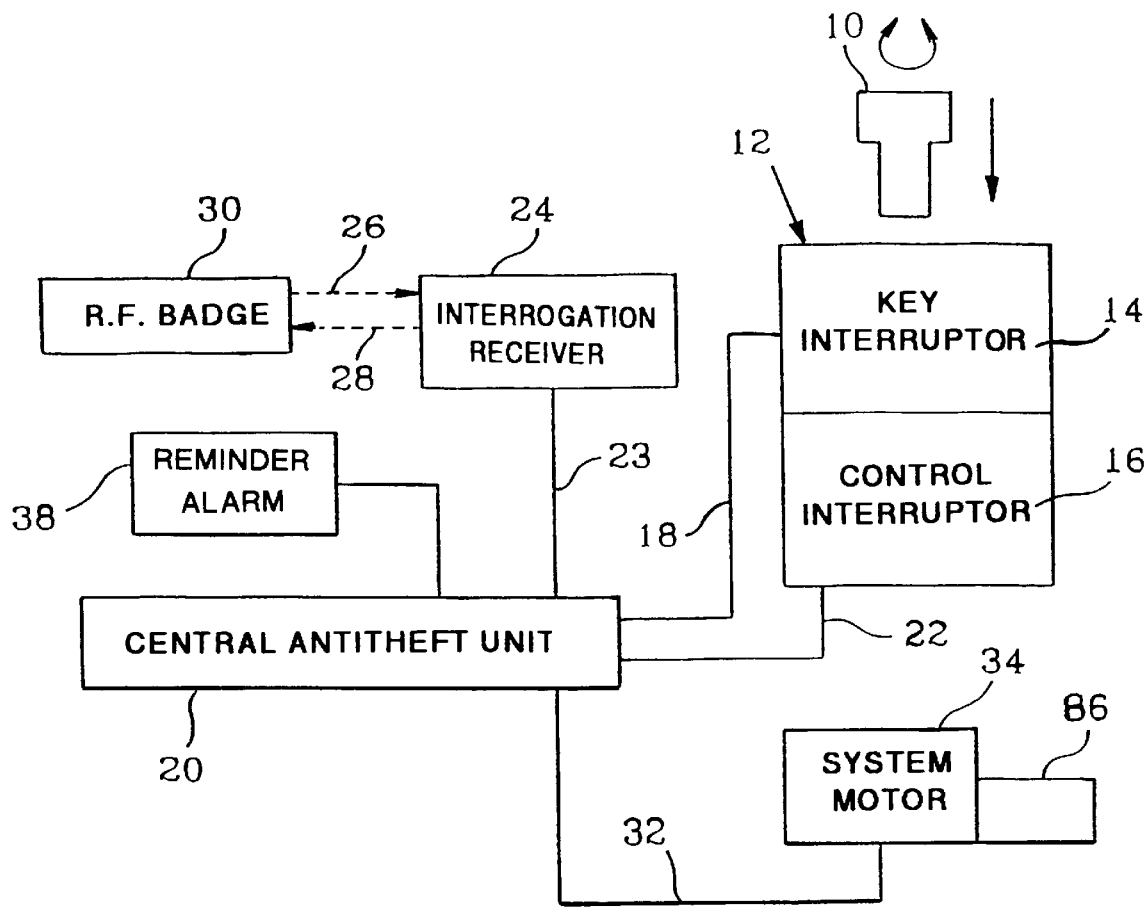
FIG. 1 is a diagram illustrating an embodiment of an anti-theft system in accordance with the state of the art.

The electrical anti-theft security system shown diagrammatically in FIG. 1 includes a key 10, or a "false key", which is adapted to be introduced into the key barrel, or into a "false" key barrel, of an anti-theft security switch 12.

The switch 12 is arranged to be mounted on the fascia of the vehicle, and its design is of a substantially similar type to that of the ignition switch of a vehicle in a conventional form. The user operates the contact key 10, or an ignition ring which simulates such an operation. The contact key 10 is in fact, in this example, a false key, and it does not necessarily operate on a mechanical lock, even though an actual key of this kind does afford an additional degree of safety by adding a supplementary locking or unlocking means in series with the general design of an electrical anti-theft system.

The security switch 12 comprises a key interruptor 14 which is adapted to detect the absence of the key 10 or the presence of the latter in position when it has been introduced. The switch 12 also includes a multiple position control interruptor 16, for controlling the starting of the engine of the vehicle and for controlling the power supply to various electrical circuits of the vehicle.

The key interruptor 14 is connected through a line 18 to one input of an electronic central anti-theft unit 20, while the control interruptor 16 is connected through a line 22 to another input of the central anti-theft unit 20.

The central anti-theft unit includes an analysis circuit which is, in particular, capable of reading the positions, or states, of the interruptors 14 and 16 in the switch 12. For example, the anti-theft unit 20 may include a microcontroller such as an INTEL 8051 circuit. This circuit contains a programme for reading the input ports so as to inform the central anti-theft unit of the positions of the various interruptors of the switch 12, as will be explained later herein.

In accordance with a known design, and through another input and a line 23, the central anti-theft unit is able to exchange signals with an interrogation and receiving station 24, which in turn exchanges, through further lines 26 and 28, signals with, for example, a badge 30 carried by the user for giving keyless access to the vehicle.

Depending on these exchanges of signals with the central anti-theft unit 20, the latter produces, on a connecting line 32, a command signal for energising, in one direction or the other, an anti-theft motor 34 which acts on a blocking member 36 for mechanically locking the steering column of the vehicle or the output shaft of the gearbox. The motor 34 and blocking member 36 together constitute a motorised security device.

In FIG. 1, the motor 34 is referred to as a "system motor", for reasons that will become apparent later herein.

In addition, if the user overlooks the radio frequency badge 30 inside the vehicle by mistake, or if he omits to operate the key 10 in order to initiate a sequence for locking the anti-theft system, or if he leaves his badge 30 in the vehicle by mistake, the central anti-theft unit 20 sets off a reminder alarm 38.

A first embodiment of an electrical anti-theft security system in accordance with the invention will now be described with reference to FIG. 2, in which those components which are identical or similar to those in FIG. 1 are designated by the same reference signs.

The key interruptor 14 includes a pivoting movable contact 42 which is permanently connected to the positive terminal +BAT of the battery of the vehicle. The free end of the contact 42 cooperates with a fixed contact 44 in the absence of the key, or with a fixed contact 46 when the key 10 is introduced into the anti-theft security switch 12.

The fixed contact 44 is connected through a line 48 to the power supply input 49 of an electrical power supply unit 50 for supplying power to the motor 34. The power supply unit 50 receives command signals for the locking and unlocking of the system, over lines 32V and 32D, which are connected to output ports LOC and UNL respectively of the central anti-theft unit 20.

The fixed contact 46 of the key interruptor 14 is permanently connected through the line 18 to a "DEMAND" input port of the central anti-theft unit 20, so that the latter is able to set in train a sequence of steps for identification of the demand for unlocking of the anti-theft system, or the demand for locking of the anti-theft system.

The multiple position control interruptor 16 is an interruptor of the rotary type which includes a movable control contact 52, which is connected permanently to the positive terminal +BAT of the battery of the vehicle.

The movable control contact 52 is arranged to occupy a plurality of successive positions which are offset from each other in the direction of rotation of the contact 56. These positions are designated "O", "ACC", "R" and "S" in the drawings. In these successive positions, namely a stop position (O), a position for supplying power to electrical accessories of the vehicle (ACC), a running position (R), and a position for starting the engine of the vehicle (S), the rotary control contact 52 is arranged to cooperate with one or more conductive strips 54, 56, 58, 60 which are arranged in an arc of a circle and which constitute the fixed contacts of the interruptor 16.

When the movable contact 52 is in the ACC position, it cooperates with the fixed strip 54, which is connected electrically to the power supply circuit ACC for the accessories of the vehicle.

When the movable control contact 52 is in the "R" position, it is simultaneously in contact with the contact strip 54 and also with the further contact strip 56, which is connected to the ignition circuit +IGN of the engine of the vehicle.

When the movable control contact 52 is in the "S" position, it is in contact with the fixed contact strip 56 and with the fixed contact strip 58.

The contact strip 58 is the fixed contact connected through an output STA to the starter circuit of the internal combustion engine (not shown) of the vehicle. The output STA is connected to the starter in a manner which will be described in greater detail later herein.

When the movable control contact 52 is in contact with the leading end of the contact strip which constitutes the fixed contact 54, starting from the stop position "O", it comes simultaneously into contact with an arcuate contact strip 60 which is the fixed contact for the purpose of unlocking the system (in the sense of the term used in the present invention). The arrangement of the contact strip 60 with respect to the contact strip 54 is such that the movable contact 52 is in simultaneous contact with both of the strips 54 and 60 over part of its angular travel during the course of which it travels over the contact strip 54. This part of the travel is delimited by an immobilising device 64 which, in this embodiment, is shown in the form of an electromagnet.

Figure 2:
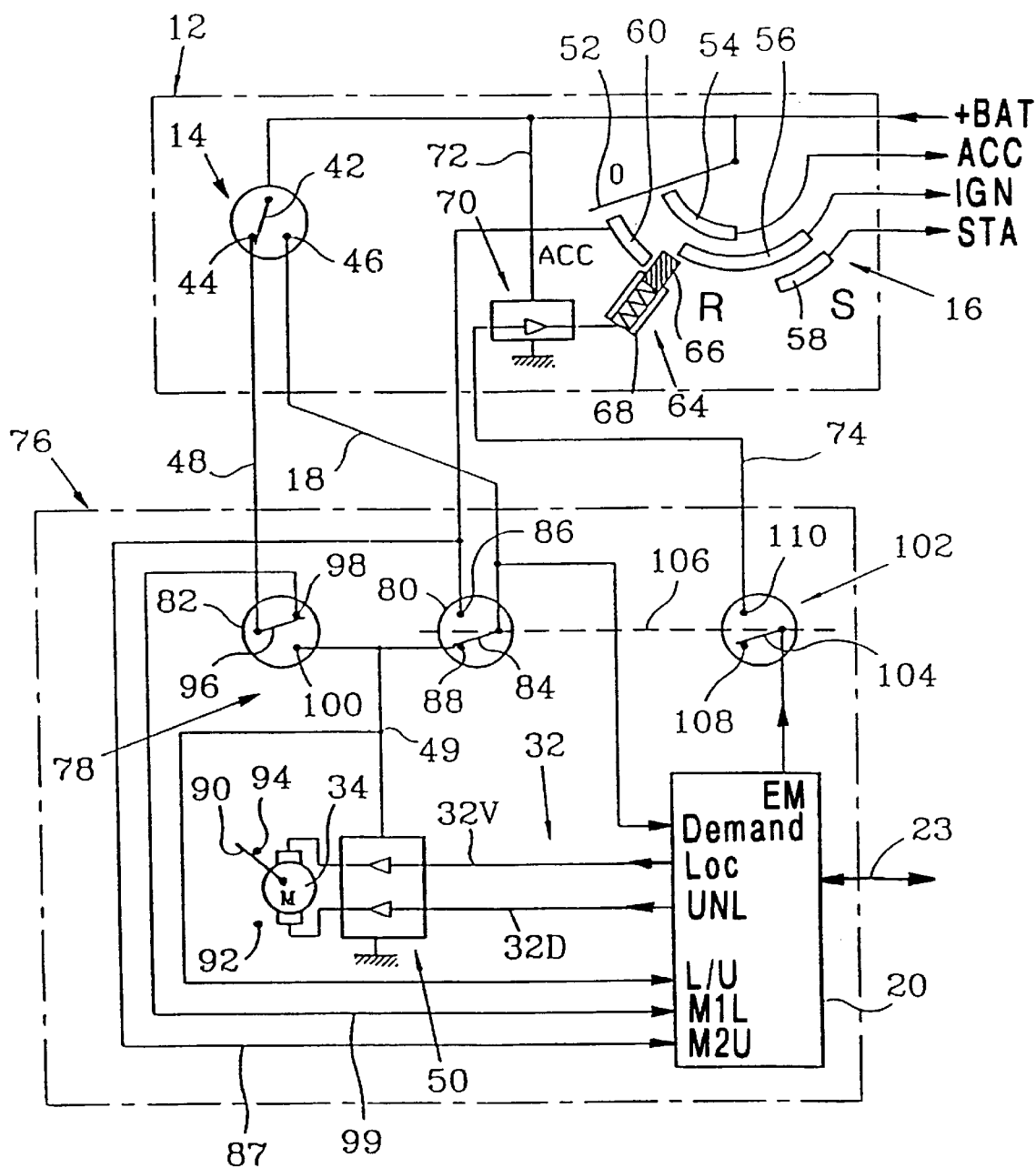
FIG. 2 is a diagram which shows one embodiment of an anti-theft system in accordance with the invention, in which the electrical anti-theft system is shown in its locked condition.

The electromagnet 64 includes a plunger or core 66, which is resiliently biased permanently by a spring into its extended position shown in FIG. 2, in which it projects outside the housing 68. In this position, the plunger or core 66 lies, adjacent to the end of the unlocking contact strip 60, across the path of travel of the movable control contact 52, so as to prevent any angular travel of the latter beyond the contact strip 60 towards the ignition contact strip 56 and the starter contact strip 58. This situation exists so long as the immobilising electromagnet 64 has not been energised electrically in such a way as to retract the movable core or plunger 66 of the electromagnet into the housing 68 of the latter.

From the operating point of view, and having regard to the rotation of the movable contact 52 in the anticlockwise direction (with reference to FIG. 2), the immobilising device 64 is therefore disposed downstream of the unlocking contact strip 60 and upstream of the ignition contact strip 56 and starter contact strip 58.

The immobilising electromagnet 64 is supplied with electrical energy through a power supply unit 70 which is connected directly to the positive pole +BAT of the battery through a line 72, and which receives the command signals for release of the immobilising device, that is to say the signal for energising the coil of the electromagnet 64, through a line 74 which is connected to an output port EM of the central anti-theft unit 20.

So long as the power supply unit 70 has not received any command from the central anti-theft unit 20, and starting from the locked position shown in FIG. 2, it is impossible for the movable control contact 52 to reach the contact strips 56 and 58.

The disabling module 76, shown in the lower part of FIG. 2 within a box of phantom lines, will now be described in greater detail. The disabling module 76 includes means 78 for detecting the locked or unlocked condition of the anti-theft system. These detecting means 78 deliver a corresponding signal to the central anti-theft unit 20.

In the first embodiment which is shown in FIGS. 2 to 5, the detecting means 78 consist of two detecting interruptors 80 and 82, each of which is of the changeover type having two positions. The interruptor 80 which detects the unlocked condition of the system comprises a swinging movable contact element 84, which is permanently connected through the line 18 to the fixed contact 46 of the key interruptor 14. The movable contact 84 is also permanently connected to the "DEMAND" input of the central anti-theft unit 20. The movable contact element 84 is arranged for cooperation with a first fixed contact 86 when the system is in its unlocked position. The fixed contact 86 is connected through a line 87 to an input port M2U of the central anti-theft unit 20, for detection of the unlocked condition.

When the anti-theft system is in the locked condition shown in FIG. 2, the movable contact 84 is in contact with a second fixed contact 88 of the interruptor 80. This contact 88 is connected to the electrical power supply input 49 of the power supply unit 50 for the motor 34. It is also connected to the central anti-theft unit 20 through the interruptor 82 for detection of the locked condition of the system.

The movable contact 84 of the interruptor 80 is coupled in rotation to the motor 34. The drawings show diagrammatically a movable finger 90 which is coupled in rotation to the motor 34, for movement through an arc between two end stop positions in which it meets a respective one of two mechanical end stop elements 94 and 92, which correspond to the locked and unlocked states of the system respectively.

The design of the interruptor 80 for detection of the unlocked condition is such that the movable contact 84 comes into engagement with the fixed contact 86 before the movable finger 90 reaches the end stop 92 corresponding to the unlocked state.

The interruptor 82 for detection of the locked condition of the system comprises a movable contact element 96 which is permanently connected through the line 48 to the fixed contact 44 of the key interruptor 14. In the locked condition shown in FIG. 2, the movable contact 96 cooperates with a fixed contact 98, which is connected directly through a line 99 to an input port M1L of the central anti-theft unit 20, for detection of the locked condition of the system. The movable contact element 96 is also arranged to cooperate with a second fixed contact 100 which is permanently connected to an inlet port L/U of the central anti-theft unit 20, and is also connected to the power supply inlet 49 of the power supply unit 50 for the motor 34, and to the second fixed contact 88 of the interruptor 80 for detection of the unlocked condition.

Finally, the electrical anti-theft system includes an immobiliser interruptor 102 which is interposed in the line 74 between the central anti-theft unit 20 and the electrical power supply unit 70 for the immobilising electromagnet 64. The interruptor 102 has a movable contact element 104 which is coupled mechanically to the movable contact element 84 of the interruptor 80 for detecting the unlocked condition of the system, in such a way that the movable contacts 104 and 84 move in tandem. This mechanical coupling is indicated diagrammatically in the drawings by a broken line 106.

The movable contact element 104 is in contact, when the anti-theft system is in its locked condition, with a fixed dead contact 108, and it is arranged to make electrical contact with a fixed contact 110 when the system is in its unlocked condition, that is to say when the movable element 84 of the interruptor 80 for detecting the unlocked condition reaches its unlocked condition in contact with the fixed contact 86.

The operation of the electrical anti-theft system shown in FIGS. 2 to 5 will now be described. In its locked condition shown in FIG. 2, the finger 90 of the motor 34 is in contact with the mechanical end stop 94 corresponding to the locked condition, and the movable contact 42 of the interruptor 14 is in contact with the fixed contact 44, while the movable control member 52 is in its stop position "O".

Figure 3:
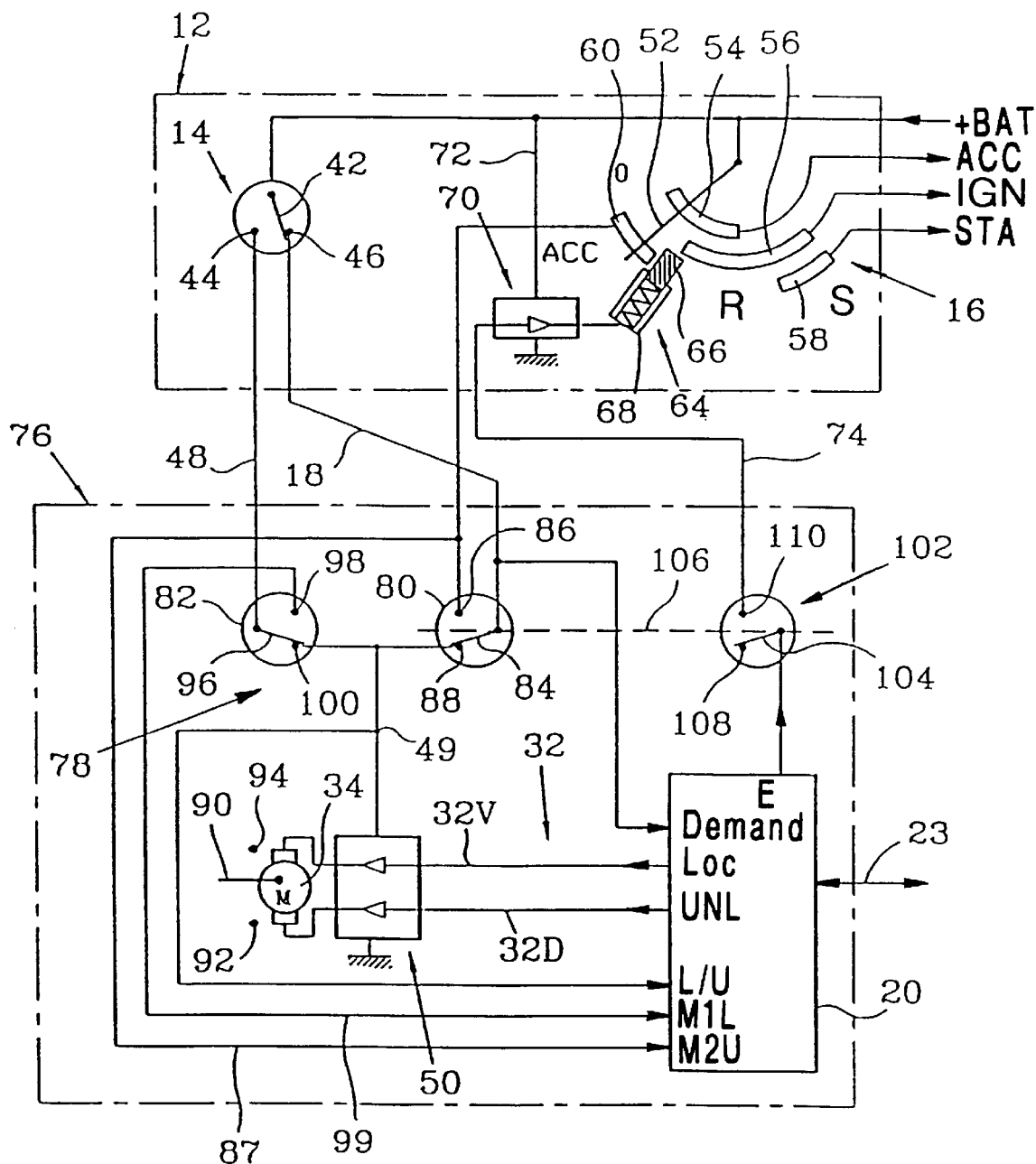
FIG. 3 is a diagram similar to that in FIG. 2, in which the electrical anti-theft system is in transition between its locked condition and its unlocked condition.

When the driver introduces the key 10 into the anti-theft security switch 12, this, at first, causes the key interruptor 14 to change state by passing from the condition shown in FIG. 2 to the condition shown in FIG. 3. In this new position, the movable contact member 42 is in contact with the fixed contact 46, and transmits a demand for unlocking of the system, over the line 18 to the "DEMAND" inlet port of the central anti-theft unit 20.

The change of state of the key interruptor 14 also has the effect of causing the power supply unit 50 for the motor 34 to be itself supplied with power through the line 18 and through the interruptor 80 for detection of the unlocked condition, the fixed contact 88 of the interruptor 80 being connected to the power supply input 49.

The driver then rotates the multiple contact control interruptor 16, in such a way that its movable control element 52 can pivot into its immediately adjacent angular position ACC, in which it is in simultaneous contact with the fixed contact strips 54 and 60.

The central anti-theft unit 20 transmits to the power supply unit 50, through its output port LOC, a command for unlocking of the system, as a result of which the motor 34 is energised and rotates to an intermediate position which is shown in FIG. 3. In this intermediate position, the interruptor 82 for detection of the locked condition has already changed its position, so causing a change of state to occur at the input port M1L of the central anti-theft unit 20.

Rotation of the motor 34 continues until the system is in its unlocked condition. The electrical power supply of the unit 50 is maintained up to the end of the unlocking operation, by the contact 60 and the movable element 84 in contact with the fixed contact 86.

Figure 4:
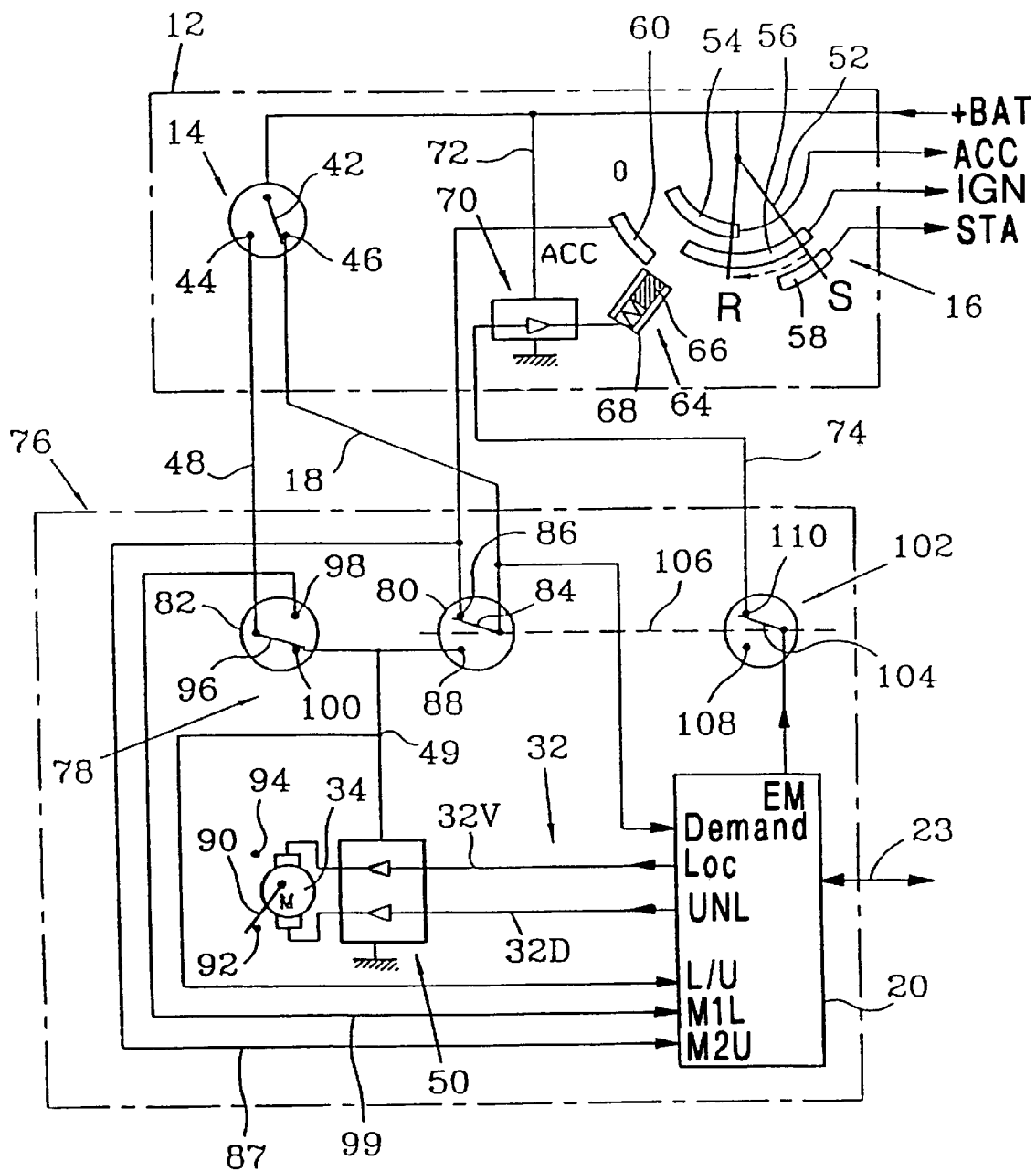
FIG. 4 is a diagram similar to FIG. 3 in which the electrical anti-theft system is shown in its unlocked condition.

At the end of this change of condition of the anti-theft system, the motor 34 is arrested by the movable finger 90 coming into engagement with the end stop 92 corresponding to the unlocked state, and the interruptor 80 for detection of the unlocked state reaches the position shown in FIG. 4, and at the same time causes the immobiliser interruptor 102 to change its state.

When the movable contact element 84 of the interruptor 80 for detection of the unlocked condition is in its "unlocked" position, the movable element 104 of the immobiliser interruptor 102 has put the central anti-theft unit 20 into communication, via the line 74, with the power supply unit 70 for the electromagnet 64. A signal is thus passed to the electromagnet 64 so as to cause the plunger 66 to be retracted into the housing 68 of the electromagnet, so releasing the contact element 52.

It is now possible for the driver to continue operating the multiple position interruptor 16, in particular towards its "run" position "R" and its "start engine" position "S", thus enabling the engine of the vehicle to be started and the vehicle then used.

In the normal "run" position R, the movable contact 52 is in simultaneous contact with the fixed contact 54, supplying power to the accessories ACC, and with the fixed contact 56 which supplies power to the ignition circuit IGN.

Figure 5:
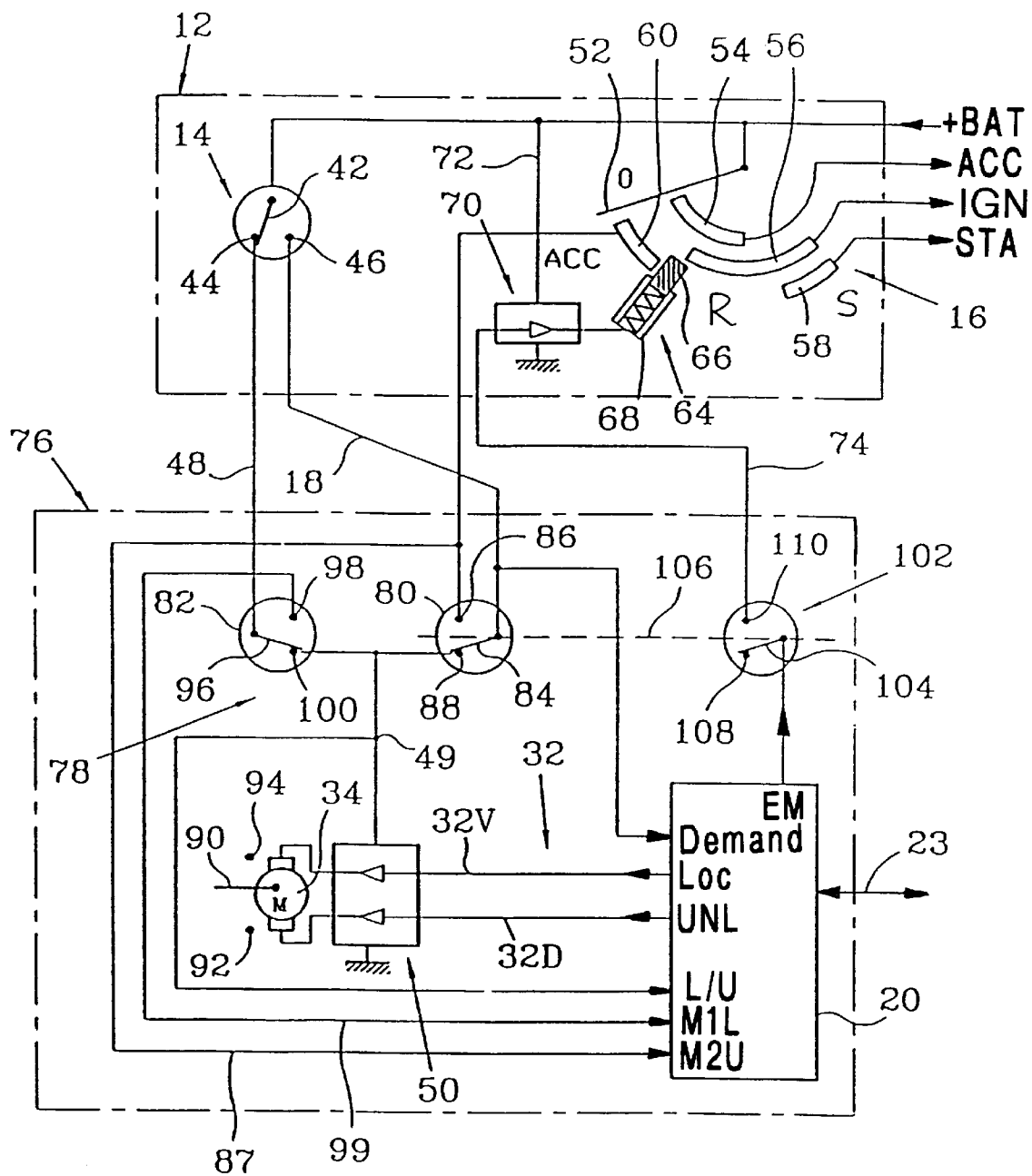
FIG. 5 is a diagram similar to that in FIG. 2, in which the anti-theft system is shown in transition between its unlocked condition and its locked condition.

When the driver stops the vehicle and desires to lock the anti-theft system, he first returns the movable contact 52 of the multiple position 16 to the stop position "O", as is shown in FIG. 5. In this position it is no longer in contact with any of the fixed contact strips 54 to 60. At the end of this rotation, the driver removes the false key 10, the effect of which is to return the key interruptor 14 to its position shown in FIG. 2 to 5, in which the movable contact 42 connects the positive battery terminal +BAT directly to the fixed contact 44 and to the line 48.

The return of the key contact from its active position shown in FIG. 4 to its rest, or parked, position (shown in FIG. 5) also has the effect of supplying electrical energy to the input 49 of the power supply being transmitted to the "DEMAND" input port of the central anti-theft unit 20, the state of which has changed; and a signal is transmitted to the input port L/U.

The central anti-theft unit 20 then transmits an order for locking of the system over the line 32D, to the power supply unit 50 and to the motor 34. The motor then leaves its "unlocked" position in which the movable finger 90 is in contact with the end stop 92 moving to the "locked" position set by the end stop The various components are then restored to their respective position shown in FIG. 2.

In this connection, during the rotation of the m the "locked" position, the interruptor 80 for the unlocked condition changes state; and simultaneously, the immobiliser interruptor 102 changes state so as once again to interrupt the connection between the central anti-theft unit 20 and the power supply unit 70 for the electromagnet 64. This causes the plunger 66 of the electromagnet to be deployed, so as then once again to prevent the movable control contact element 52 from gaining access to the fixed contact strips 56 and 58 of the switch 16.

It can now easily be understood that, so long as the driver has not withdrawn the false key, that is to say he has not caused any change of state to occur in the key interruptor 14 from the position occupied by the latter in FIG. 4, it is not possible for the power supply unit 50, under the control of the central anti-theft unit 20, to cause the system to become locked, because the power supply unit 50 is not supplied with any electrical power.

Reference is now made to FIGS. 6 to 9 showing a second embodiment of the invention. In FIGS. 6 to 9 those elements which are identical or similar to those in FIGS. 1 to 5 are indicated by the same references.

In this embodiment, the detecting means 78 consist of two Hall effect sensors 80 and 82, which are connected to the input ports H2L and H1U of the central anti-theft unit 20, via lines 87 and 99 respectively. The movable finger 90 coupled in rotation to the motor 34, apart from its cooperation with the mechanical end stops 94 and 92 corresponding to the locked and unlocked conditions of the system respectively, also cooperates with the sensors 80 and 82 so as to act on these two sensors according to the position which it occupies with respect to them. The control line 74 for the power supply unit 70 for the electromagnet 64 is connected in this example directly to the output port EM of the central anti-theft unit 20. The fixed contact 44 of the key interruptor 14 is connected directly to the power supply input 49 of the motor power supply unit 50, which is also connected directly to the "unlocked" fixed contact strip 60 of the control interruptor 16. Finally, the fixed contact 46 of the key interruptor 14 is connected directly to the "DEMAND" input port of the central anti-theft unit 20.

The operation of this second embodiment of the electrical anti-theft system in accordance with the invention will now be described with reference to FIGS. 6 to 9.

Figure 6:
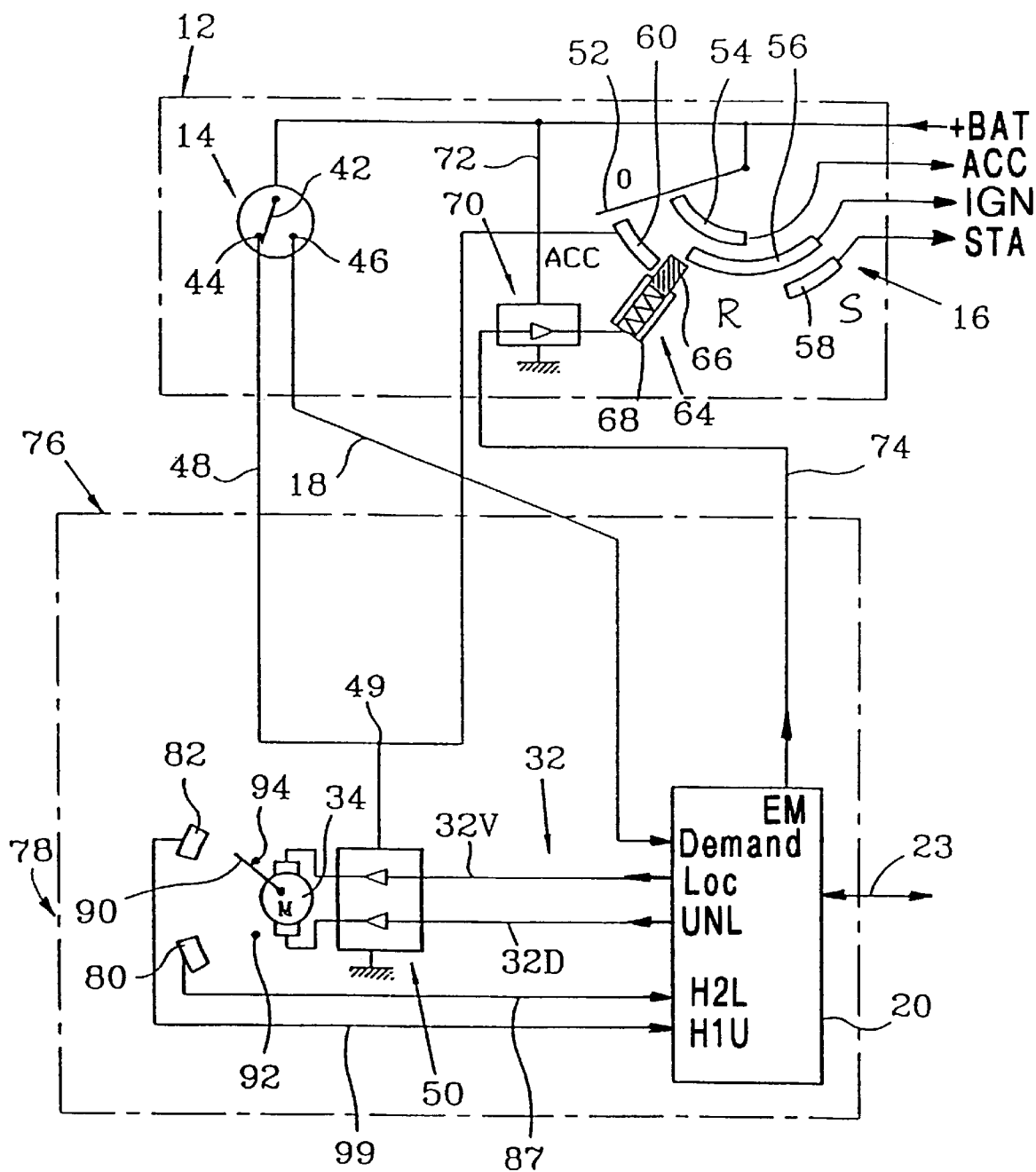
FIGS. 6 to 9 are diagrams similar to those in FIGS. 2 to 5 respectively, but showing a second embodiment of an electrical anti-theft system in accordance with the invention.

In the locked condition shown in FIG. 6, the system is in its locked condition, with the key interruptor 14 and the control interruptor 16 in their respective parked positions. When the driver introduces a key 10 into the security switch 12, and causes the movable control contact 52 to rotate into the ACC position, it simultaneously causes the motor power supply unit 50 to be supplied with electrical power, and it transmits a demand for unlocking of the system to the "DEMAND" input port of the central anti-theft unit 20 over the line 18.

The central anti-theft unit 20 transmits an order over the line 32D to the power supply unit 50, which causes the motor 34 to rotate. At the beginning of this rotation, after the finger 90 has left contact with the "locked" end stop 94, the movable finger 90 passes in front of the sensor 82, which transmits a change of state signal to the input port H1U of the central anti-theft unit 20.

Figure 7:
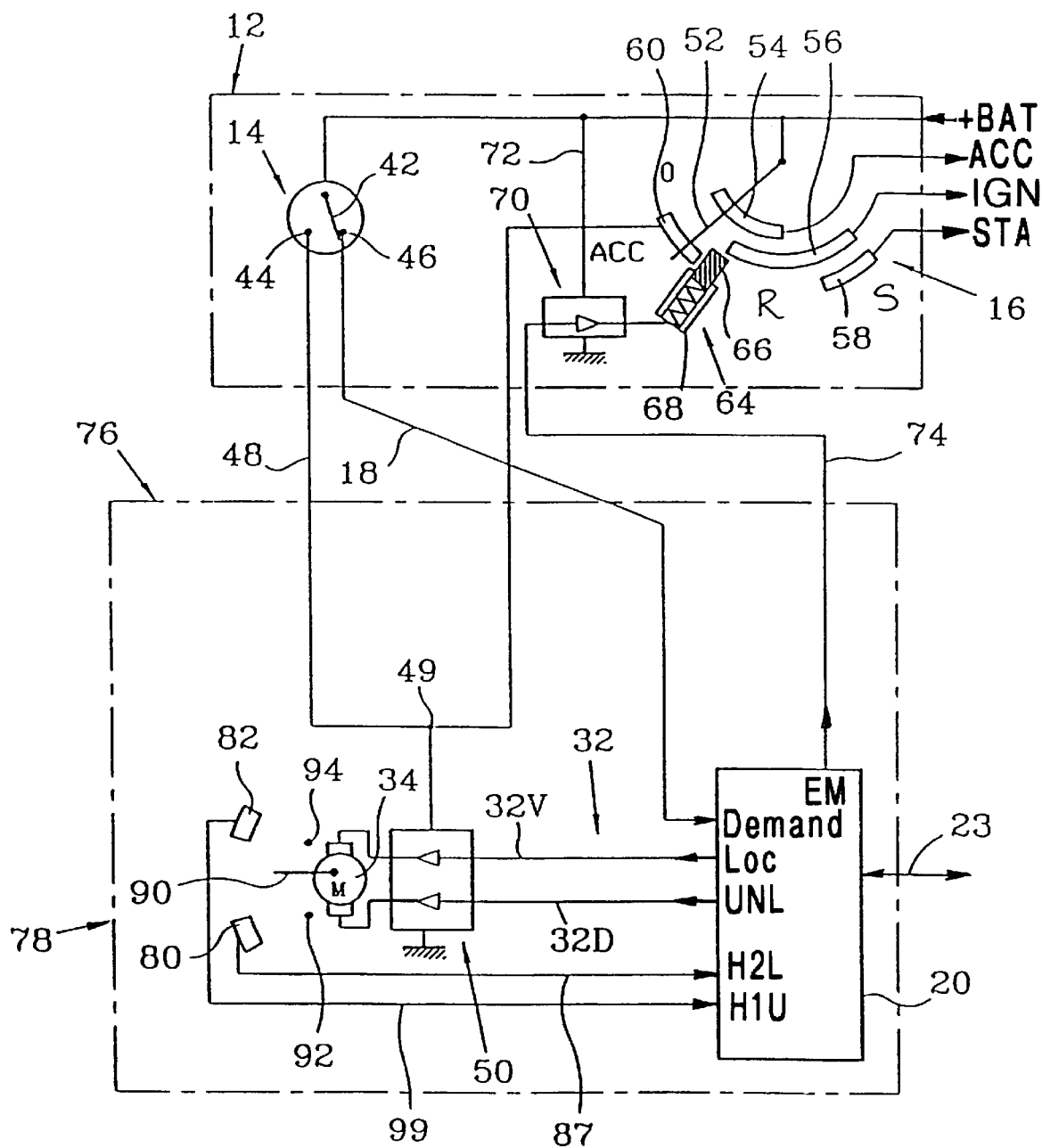

So long as the system is not in its unlocked condition, that is to say so long as the element 90 has not passed in front of the "unlocking" sensor 80, the immobiliser electromagnet 64 remains in its position shown in FIGS. 6 and 7, in which it prevents the movable control element 52 of the interruptor 16 from gaining access to the fixed contact strips 56 and 58. At this stage, it is therefore impossible to start the engine.

Figure 8:
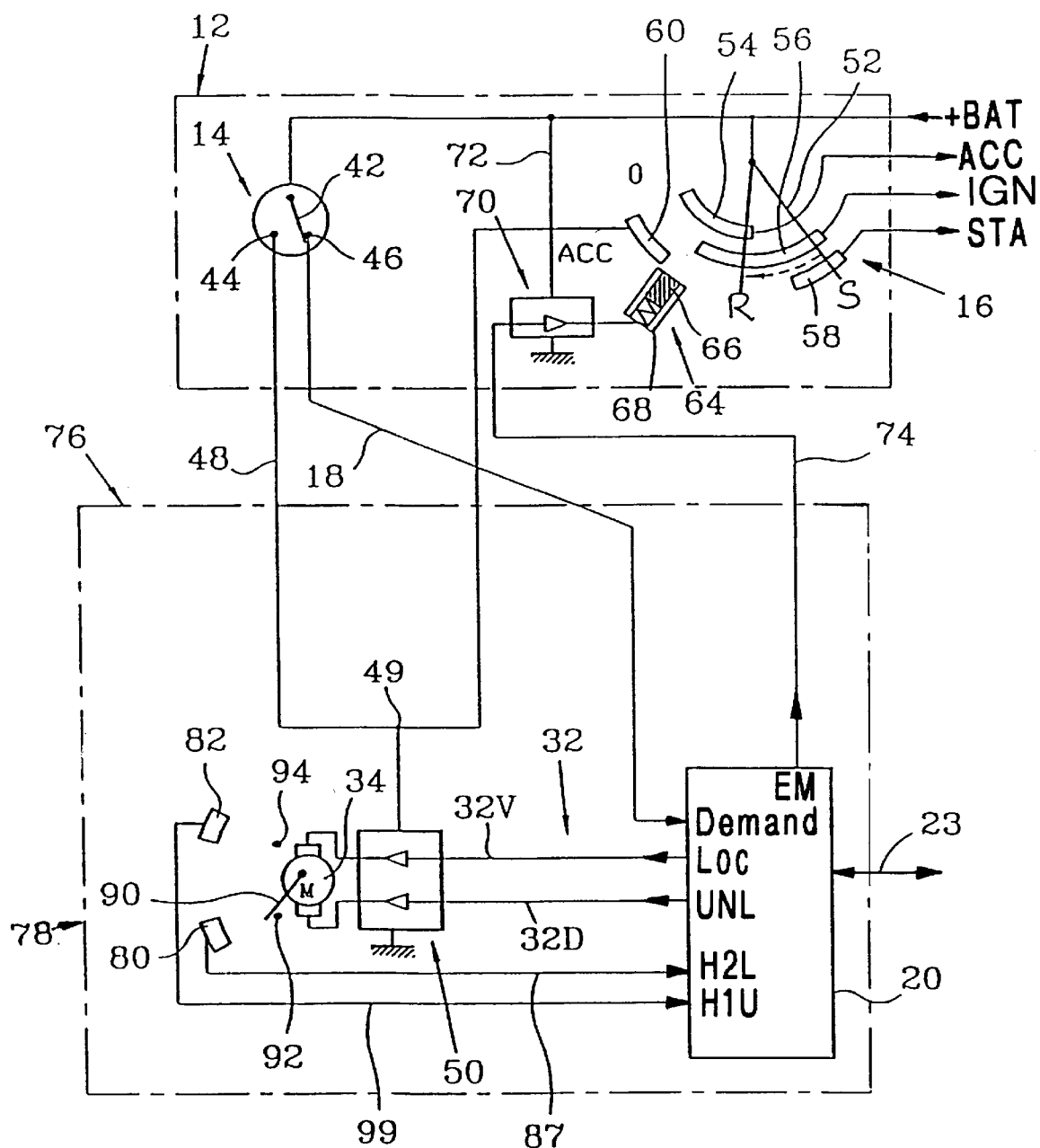

When the motor 34 reaches its "unlocked" position, that is to say when the steering lock 36 (FIG. 1) is released, and as is shown in FIG. 8, the central anti-theft unit 20, which has received an unlocking signal at its input port H2U from the sensor 80, transmits over the line 74 an order to the power supply unit 70 for the electromagnet 60, such as to cause the plunger 66 of the latter to be retracted. The driver can then continue to operate the multiple position switch 16, in particular into the ignition or run position R and the starting position S.

Figure 9:
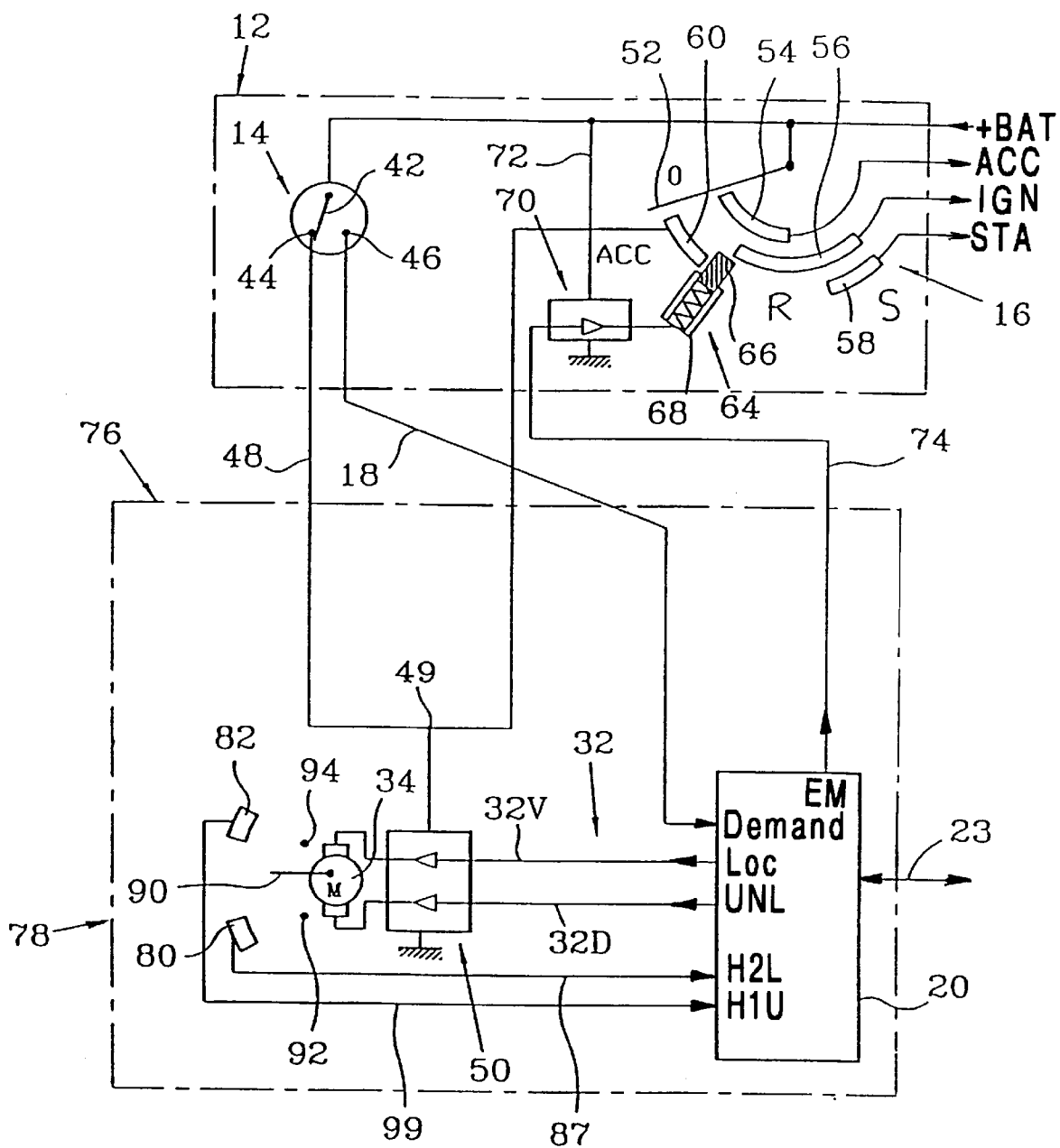

When the driver stops the vehicle, and as is shown in FIG. 9, he returns the multiple position switch 16 and the key interruptor 14 into their parked positions shown in FIG. 9. This causes a demand signal for locking of the system to be given, and this signal is passed over the line 18 to the "DEMAND" input port of the central anti-theft unit 20, which accordingly changes its state.

When the central anti-theft unit 20 receives from the sensor 82 a signal that indicates to it that the system has been locked, it sends over the line 74, to the power supply unit 70 for the electromagnet 64, a signal for interrupting the power supply of the latter and causing the plunger 66 to be deployed. Thus any further operation of the vehicle is no longer possible because the anti-theft system will no longer be in its unlocked condition.

As in the case of the first embodiment, it will be understood that it is impossible to operate the starter so long as the security device 34, 36 is not in its unlocked condition, and that it is equally impossible to cause any accidental locking of the system, and in particular the steering column lock, when the vehicle, or at least its engine, is moving, due to the energisation of the power supply unit 50 for the motor 34.

The invention is not limited to the embodiments described above. In particular, it is not limited to an arrangement in which the key interruptor 14 is in the form of an electrical interruptor controlled by a false key. This function may be replaced by any other type of electrical interruptor which is controlled directly or indirectly by the driver.

Similarly, the multiple position interruptor is not necessarily of the rotary kind.

What is claimed is:

1. An anti-theft system for a motor vehicle having an engine, an ignition system for the engine, a starter for the engine, and electrical accessories, the vehicle having electrical circuits for supply of power to the ignition system and the said accessories, and a power supply source connected to the said circuits through the anti-theft system, the anti-theft system comprising: an anti-theft switch for controlling starting of the engine and the supply of power to the said circuits; a motorised security device comprising a blocking member and an electric drive motor coupled to the blocking member for displacing the latter between a locked position and an unlocked position; and a central anti-theft unit connected to the said anti-theft switch and the said motor, the central anti-theft unit being adapted to control operation of the anti-theft system, wherein the said anti-theft switch comprises: a key interruptor for detecting simulated introduction of a key into the anti-theft switch; and a multiple position control interruptor for connection to said electrical circuits of the vehicle and for controlling power supply to said circuits and to the starter in sequence, the said multiple control interruptor comprising a movable control contact connected to one polarity of the power supply source, and a set of fixed contacts for connection variously to said circuits and to the starter, and so disposed as to be contacted successively by the movable control contact of the multiple position switch as the latter is operated for starting the vehicle, the last one of the said fixed contacts in the said sequence being connected to the starter, and the said control interruptor being adapted so that it cannot be actuated except in the presence of a key, the anti-theft system further including an immobilising device for inhibiting the control interruptor in such a way as to prevent the movable control contact element of the latter from making contact with at least the fixed contact connected to the starter so long as the said system is in a condition other than its unlocked condition, the said immobilising device being such that, in response to a release signal from the central anti-theft unit, it enables the movable contact of the multiple position interruptor to come into contact with the fixed contact for energising the starter, the immobilising device including a power supply unit which is connected directly to the said electrical power supply source and which is connected also to the central anti-theft unit, the system further including detecting means for detecting the unlocked state of the system and for delivering a corresponding signal to the central anti-theft unit, and wherein the central anti-theft unit is adapted to be unable to transmit a release signal to the immobilising device except on receipt of an unlocking signal from the detecting means.

2. A system according to claim 1, wherein the motor is connected to the said supply source through the key interruptor, being further adapted so that when a key is introduced, the motor is connected through a supply line to a fixed contact of the control interruptor associated with the unlocked condition of the system, the movable control contact of the control interruptor being arranged to cooperate with the same fixed contact at the beginning of its course of travel during actuation of the control switch with a view to starting the vehicle, and wherein, in the immobilising position of the immobilising device, an inhibiting member of the latter is interposed between the fixed contacts associated with the unlocked condition of the system and with starting of the engine, respectively.

3. A system according to claim 1, wherein the detecting means comprise at least one interruptor for detecting the unlocked condition of the system, the said interruptor comprising a movable contact, a first fixed contact and a second fixed contact, the said movable contact being permanently connected to the central anti-theft unit and to the said supply source when a key is introduced, the movable contact being adapted to cooperate with the said first fixed contact when the system is in its unlocked condition and with the said second fixed contact when the system is in its locked condition, the said first and second fixed contacts being connected to the central anti-theft unit and to the central anti-theft unit and to the motor, respectively.

4. A system according to claim 3, wherein the motor is connected to the said supply source through the key interruptor, being further adapted so that when a key is introduced, the motor is connected through a supply line to a fixed contact of the control interruptor associated with the unlocked condition of the system, the movable control contact of the control interruptor being arranged to cooperate with the same fixed contact at the beginning of its course of travel during actuation of the control switch with a view to starting the vehicle, and wherein, in the immobilising position of the immobilising device, an inhibiting member of the latter is interposed between the fixed contacts associated with the unlocked condition of the system and with starting of the engine, respectively, and wherein the system further includes an immobiliser interruptor interposed between the central anti-theft unit and the power supply unit for the immobilising device, the said immobiliser interruptor being adapted to interrupt the said connection when the system is in a condition other than its unlocked condition.

5. A system according to claim 4, wherein the immobiliser interruptor has a movable contact coupled in tandem to the movable contact of the interruptor for detecting the unlocked state of the system.

6. A system according to claim 3, wherein the detecting means include an interruptor for detecting the locked condition of the system, the said interruptor comprising a movable contact arranged to be connected to the said electrical supply source in the absence of a key, a first fixed contact connected to the central anti-theft unit, and a second fixed contact permanently connected to the central anti-theft unit, to the motor, and to the second fixed contact of the interruptor for detecting the unlocked state of the system, the said movable contact being adapted to cooperate with said first and second fixed contacts when the system is in its locked and unlocked conditions, respectively.

7. A system according to claim 1, wherein the detecting means comprise at least one sensor for sensing the position of an element selected from the motor and the said blocking member in the unlocked condition of the system, the said sensor being connected to the central anti-theft unit.

8. A system according to claim 7, wherein the motor is connected to the said supply source through the key interruptor, being further adapted so that when a key is introduced, the motor is connected through a supply line connected to a fixed contact of the control interruptor associated with the unlocked condition of the system, the movable control contact of the control interruptor being arranged to cooperate with the same fixed contact at the beginning of its course of travel during actuation of the control switch with a view to starting the vehicle, and wherein, in the immobilising position of the immobilising device, an inhibiting member of the latter is interposed between the fixed contacts associated with the unlocked condition of the system and with starting of the engine, respectively, and wherein the central anti-theft unit is adapted so that it can only transmit a release signal to the immobilising device when it has received an unlocking signal from the position sensor.

9. A system according to claim 7, wherein the detecting means comprise a sensor for sensing the position of an element selected from the motor and the said blocking member in the locked condition of the system, the said sensor being connected to the central anti-theft unit.

10. A system according to claim 1, wherein the anti-theft security switch is of a rotary type.

11. A system according to claim 1, wherein the key interruptor comprises a movable contact connected to the said supply source, a first fixed contact connected to the motor, and a second fixed contact connected to the central anti-theft unit, the said movable contact being adapted to cooperate with the said first and second fixed contacts in the presence and absence of an introduced key, respectively, whereby to transmit to the central anti-theft unit a signal demanding unlocking or locking of the system.

12. A system according to claim 1, further including a motor power supply unit connected to the motor and the central anti-theft unit, and wherein the drive motor is connected electrically to the key interruptor and to the fixed contact of the said multiple position interruptor corresponding to the unlocked state of the system, through the said motor power supply unit, which is adapted to receive command signals for locking or unlocking of the system from the central anti-theft unit.

13. A system according to claim 1, wherein the immobilising device is an electromagnet having a core, and means biassing the core resiliently towards an inhibiting position, the electromagnet having a coil adapted to draw the core into a retracted position when the coil is energised.

* * * * *